United States Patent [19]

McLeod

[11] Patent Number: 5,450,592
[45] Date of Patent: Sep. 12, 1995

[54] SHARED RESOURCE CONTROL USING A DEFERRED OPERATIONS LIST

[75] Inventor: Michael J. McLeod, Garner, N.C.

[73] Assignee: Data General Corporation, Westboro, Mass.

[21] Appl. No.: 939,347

[22] Filed: Sep. 2, 1992

[51] Int. Cl.$^6$ ............................................. G06F 13/14
[52] U.S. Cl. .................................. 395/650; 395/726; 364/246.8; 364/281.8; 364/DIG. 1
[58] Field of Search ............... 395/325, 200, 725, 650; 364/246.8, 281.8, DIG. 1, 941.4, 941.8, 969.2

[56] References Cited

U.S. PATENT DOCUMENTS

| | | | |
|---|---|---|---|
| 4,604,694 | 8/1986 | Hough | 395/650 |
| 4,949,251 | 8/1990 | Griffin et al. | 395/575 |
| 5,060,144 | 10/1991 | Sipple et al. | 395/650 |
| 5,161,227 | 11/1992 | Dias et al. | 395/650 |
| 5,175,837 | 12/1992 | Arnold et al. | 395/425 |
| 5,263,161 | 11/1993 | Barth et al. | 395/650 |
| 5,274,823 | 12/1993 | Brenner et al. | 395/725 |

Primary Examiner—Jack B. Harvey
Assistant Examiner—Glenn A. Auve
Attorney, Agent, or Firm—Robert L. Dulaney

[57] ABSTRACT

A method for handling attempts by multiple processing threads to access a shared system resource is disclosed. When a thread attempts to access a locked resource, the thread creates a description of the operation it intended to perform and stores the description on a deferred operation list associated with that resource. The deferred operation list is monitored by the thread which has control of the resource. If one or more entries is detected, the entries are removed from the list and processed by the controlling thread.

11 Claims, 2 Drawing Sheets

SHARED RESOURCE CONTROL USING A DEFERRED OPERATIONS LIST

BACKGROUND OF THE INVENTION

1. Field of the Invention

The present invention relates generally to computer operating systems and more particularly to a method for controlling access to system resources.

2. Description of the Prior Art

In multithreaded operating systems wherein several different transactions are being processed at the same time, certain system resources, such as regions of modifiable code or locations in system memory, must be shared, i.e., accessible by multiple processing threads. During some operations, such as reading the contents of a memory location, a given resource may be available to more than one thread at the same time. Some operations, however, such as writing new information into a memory location, requires the thread engaged in writing the information to have exclusive access to the resource.

To prevent another thread from gaining access to the resource during such an exclusive operation, operating systems typically utilize a lock mechanism. While one thread is performing an exclusive operation on a resource, all other threads are prevented from gaining access to that resource. A problem in prior art systems involves how to handle the situation where a thread tries and fails to obtain access to a locked resource.

In some prior art operation systems, the thread may simply wait in an idle mode until the desired resource becomes available to it. No useful work is being done by the waiting thread during this period. Other prior art methods, in an attempt to improve the utilization of the system processors, remove the thread from execution and reschedule another thread. This act of rescheduling is itself an expensive operation in terms of processor time. It requires that the state of the thread being removed be saved, a determination be made as to which other thread should be scheduled, the new thread's state must be retrieved and loaded and execution of the new thread initiated. When the resource later becomes available, a similar rescheduling process must be performed again to return the removed thread to execution.

Under either of these techniques, when a resource is contended for, significant overhead costs are incurred. Also, under either technique there remains the risk of the system arriving at a deadlock condition, and therefore becoming non-functional.

SUMMARY OF THE INVENTION

The present invention relates to a method of operation of a system wherein multiple threads may contend for exclusive access to a system resource.

It is an advantage of the invention that system overhead is reduced by eliminating the requirement for a thread to wait for a resource.

It is another advantage of the invention that, since threads are not constrained to wait for a resource, the chance for deadlocking the system on a resource is substantially eliminated.

It is a feature of the invention that each resource has associated with it a deferred operation list in system memory used to retain descriptions of the desired operations.

It is another feature of the invention that, if a thread cannot obtain access to a desired resource, the thread will create a description of the operation it desired to perform and will store the operation description in the deferred operation list.

It is a further feature of the invention that when a thread obtains access to a resource, the thread will retrieve all entries from the deferred operation list and process them.

It is another feature of the invention that a loop counter is incremented and checked to insure against the deferred operation traffic being so heavy that a thread is unable to release a resource.

DESCRIPTION OF THE PREFERRED EMBODIMENT

As discussed above, from time to time during operation of a multithreaded data processing system, a thread must be granted exclusive access to a system resource, such as a memory location. In the operating system of the instant invention, resources which may be the subject of multiple simultaneous attempts by different threads to gain exclusive access have (1) a lock, to prevent more than one thread from having exclusive access at the same time, and (2) a dynamic deferred operation list associated with the resource by means of a pointer, the list being a set of memory locations in the main memory of the data processing system for retaining operational descriptions of the operations which other threads intended to perform with the resource, but were unable to perform because the resource was locked and, therefore, unavailable.

The various operating system procedures for establishing and controlling locks and dynamic lists are well documented and understood by those of ordinary skill in the art and are not discussed in detail. For example, it is well understood that the operating system programmer may define the size of the regions to be protected by each lock. In the preferred implementation disclosed herein, blocks of memory protected by a single lock were chosen to be approximately 200 bytes. The size of these blocks could have been made smaller or larger. Similarly, different operation systems may provide different techniques for implementing the lock.

Prior to discussing the method in detail, a brief discussion of the data processing system will be given. As will be appreciated by those of ordinary skill in the art, the method described herein may be employed in connection with many typical data processing systems having one or more processors and associated main memory and mass storage capability, such as AViiON systems manufactured by Data General Corporation, which employ an operating system which is capable of multithreaded operation, such as the UNIX operating system from UNIX System Laboratories. The method is implemented in the operating system by means of appropriate program instructions to be executed by the system processor.

Figure 1:
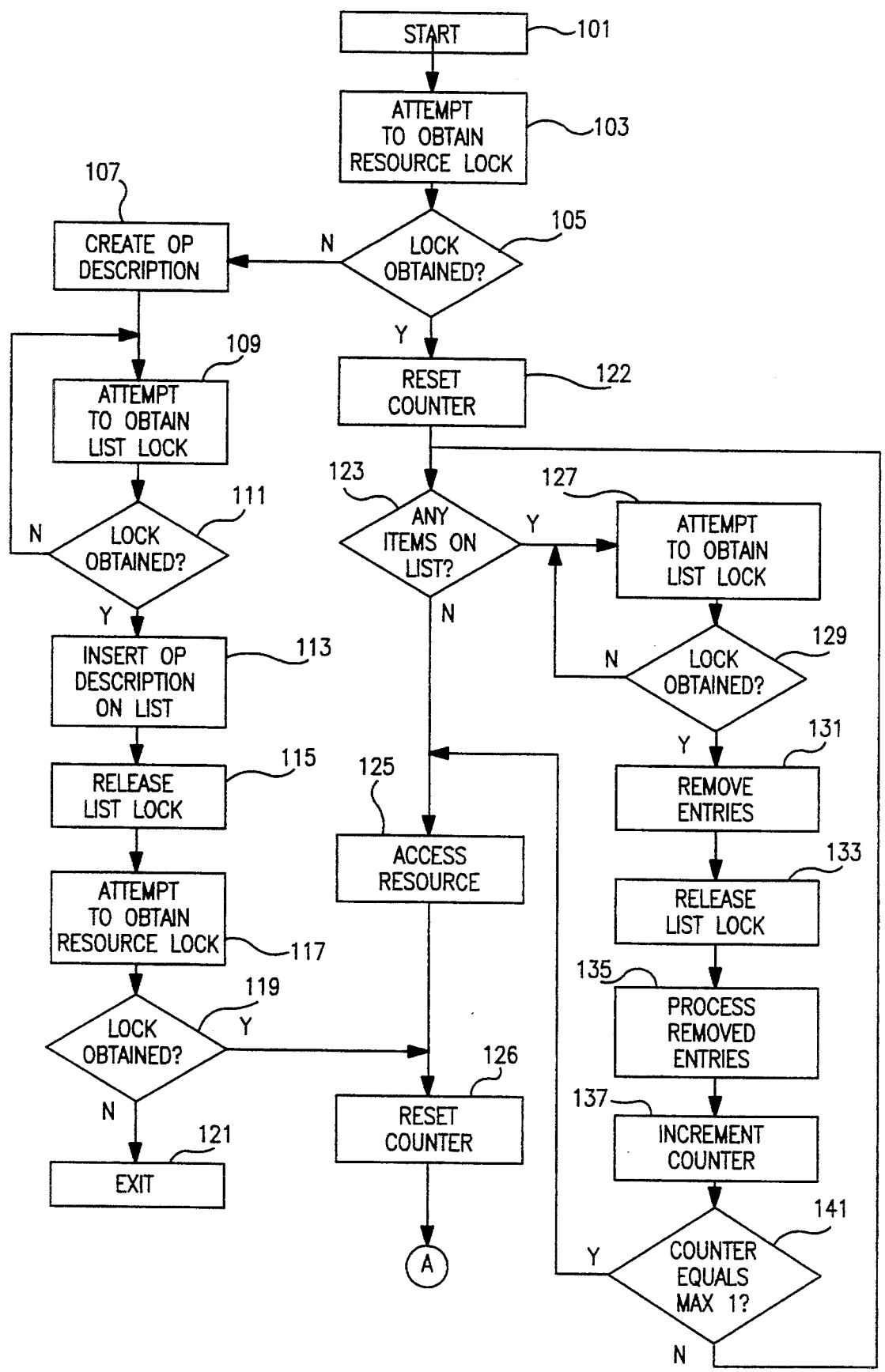
FIGS. 1 and 1A comprise a flow chart showing the operation of the invention.
Figure 1A:
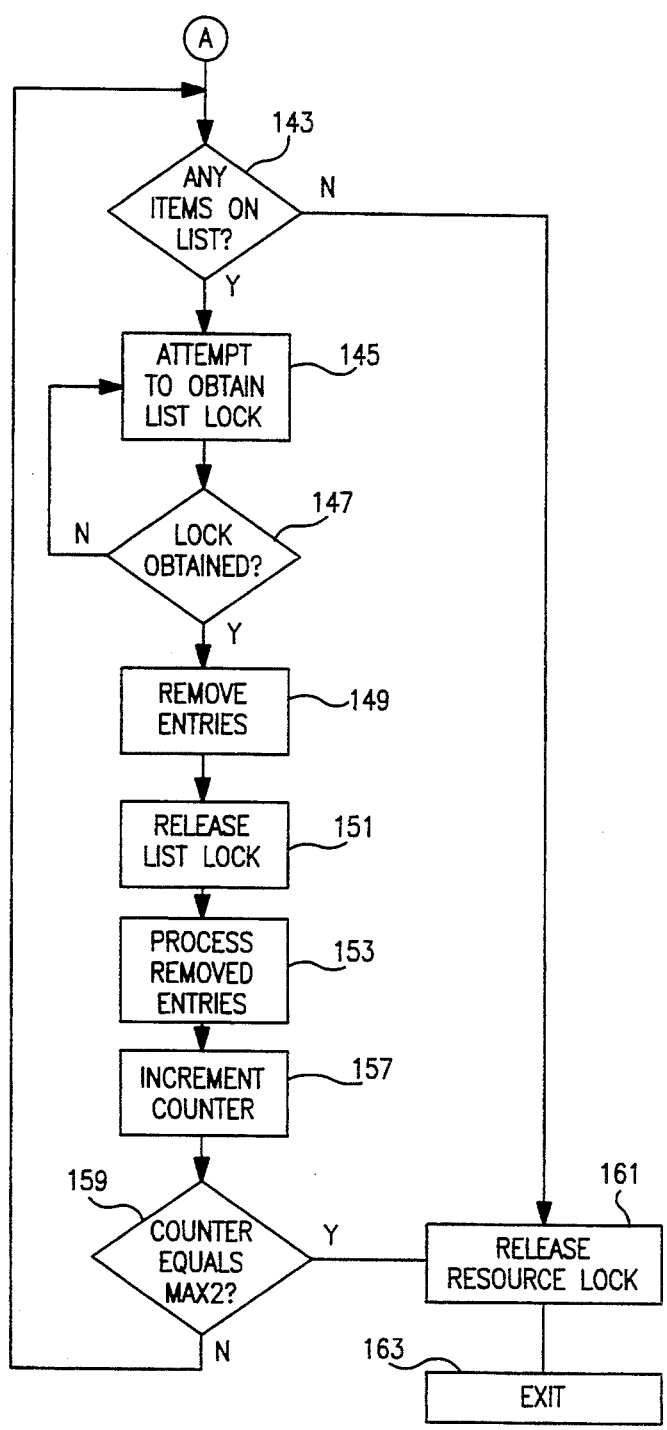

FIGS. 1 and 1A together comprise a flow chart for the method. Looking first at FIG. 1, START 101 represents the point just prior to a thread attempting to obtain the lock for its target resource. At 103 the thread attempts to obtain the target resource lock.

If the resource is locked, and therefore unavailable to the requesting thread, the thread at step 107 creates a description of the operation which it intended to perform. The operation description contains all information necessary to allow the operation to be performed at a later time by another thread.

Figure 2:
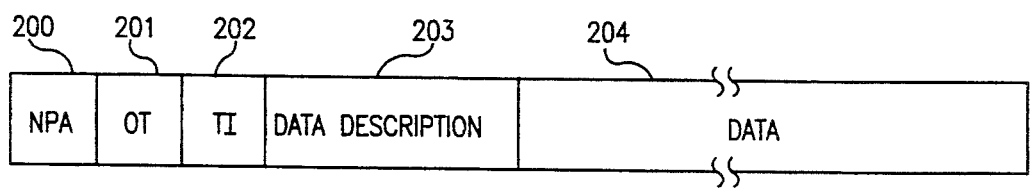
FIG. 2 is an example of an entry in the dynamic list.

Referring to FIG. 2, a preferred implementation of an operation description is depicted. It contains a four byte Next Pointer Address field 200 containing the address of the pointer of the next operation description, a four byte Operation Type field 201 indicating the particular operation to be performed, a four byte Target Identifier field 202 containing the address of the specific resource where the specified operation is to take place; and a 32 byte data description field 203 which describes the data, if any, involved in the operation and specifies the number of bytes of data to follow in the description. If required for the particular operation, data field 204 will contain the number of bytes of data specified in data description field 203.

As will be appreciated by those of skill in the art, the particular number and structure of the required operations is dependent on the particular operation system being used. In the disclosed implementation of the method in the UNIX operating system using Streams, operation type field 201 will specify one of seven possible operations. The operations and their related type identifiers are listed in Table I.

TABLE I

| ID | Operation Name | Operation Description |
| --- | --- | --- |
| 0 | Su_Defer_Service_Msg | schedule/run service routine |
| 1 | Su_Defer_Put_Msg | putnext operation |
| 2 | Su_Defer_Putq_Msg | putq operation |
| 3 | Su_Defer_Timeout_Callback_Msg | expired timeout processing |
| 4 | Su_Defer_Bufcall_Callback_Msg | buffer available processing |
| 5 | Su_Defer_Band_Allocate_Msg | allocate band list |
| 6 | Su_Defer_Invalid_Msg | invalid deferred operation |

After creating the operation description, the thread must then place the description on the deferred operation list associated with the target resource. To prevent multiple threads from attempting to access the deferred operation list at the same time, the deferred operation list also has a lock associated with it.

In step 109, the thread will attempt to obtain the deferred operation list lock. If the lock is not obtained, the thread will continue to request the list lock, steps 109 and 111, until it gains access. The deferred operation list lock need not cause rescheduling of the thread since the time required for a thread to place an operation description on or remove an operation from the deferred operation list is very small, therefore the time a thread will spend waiting for the list lock is small.

The deferred operation list is implemented in linked list fashion such that each operation description on the list, except the last entry, contains a pointer to the next operation description. To provide a fixed starting point for the deferred operation list, an initial pointer location, known to all threads, is established. This is the location that is checked in steps 123 and 143 discussed below. The initial pointer is implemented as having two addresses: a head pointer address, specifying the address of the first operation description on the list, and a tail pointer address, specifying the address of the last, i.e. most recently entered, operation description. The tail pointer allows the thread to move directly to the last entry on the linked list.

When the thread prepares its operation description in step 107 and stores its operation description in step 113, its NPA 200 field is empty. The NPA 200 will remain empty until modified by another thread which is adding an additional operation description to the deferred operation list.

When the list lock has been obtained, the thread inserts the operation description prepared at step 107 onto the deferred operation list at step 113. In performing step 113, the thread locates the previous last entry on the deferred operation list by checking the address specified in the tail pointer. The thread then stores the start address of its own operation description in the NPA 200 of the previous last entry and modifies the tail pointer portion of the initial pointer to contain the address of its own operation description, which is now the last operation description in the list. If the deferred operation description is being added to a previously empty deferred operation list, the thread will set both the head and tail pointers to the address of the operation description.

When the description has been placed on the list, the thread releases the list lock at step 115. At step 117 the thread again attempts to obtain the target resource lock. If the target resource lock is still not available, the thread exits. If, however, the thread is successful in obtaining access to the target resource at steps 117 and 119, the thread will reset the loop counter at step 126, discussed below, and proceed to step 143.

Returning to the other possible outcome of step 105, if the target resource is available, the thread obtains the resource lock, thereby gaining exclusive access to the resource and preventing another thread from gaining exclusive access to that resource until such time as the first thread releases the lock.

After obtaining the lock at step 105, the thread first resets the counter at step 122. The purpose of the counter is discussed below in connection with steps 137 and 141. The thread next at step 123 checks the deferred operation list to see if the list contains any entries.

To determine if any entries are present on the deferred operation list, the thread looks at the initial pointer location. If the pointer is invalid, indicated by filling the initial pointer with zeroes, the thread knows that the list is empty. Detection of a non-zero initial pointer indicates that one or more entries are present on the list.

If entries are present on the list, the thread performs a series of steps to retrieve and process the entries. These steps are performed before the thread performs the particular operation for which it sought control of the target resource. This first series of steps, described below, is the "obtain loop".

At step 127 the thread attempts to obtain the lock for the deferred operation list. As discussed above in connection with steps 109 and 111, the thread will continue to try to obtain the list lock until it becomes available. When the list lock is obtained, the thread removes all operation description entries from the deferred operation list at step 131.

By storing operation descriptions in main memory in a linked list manner, the thread can "remove" all operation descriptions by changing only the initial pointer. Performing step 131 involves (1) retrieving the head and tail pointers from the initial pointer location and (2)

modifying the initial pointer to the empty state. Once the initial pointer has been placed in the empty state, the deferred operation list is empty.

As soon as all list entries have been removed, the thread releases the list lock at step 133 and proceeds to process all of the entries at step 135. In step 135, therefore, the thread which gained access to the target resource will perform all of the operations specified by the operation descriptions placed on the deferred operation list by other threads which were unable to gain access to the target resource. In general, if more than one operation description was retrieved from the deferred operation list in step 131, the oldest operation descriptions are processed first. However, in a preferred embodiment, if any $Su_{13}Defer_{13}Put_{13}Msg$ operations were retrieved, they will be processed before any other operations.

It is possible that, during the time that it takes the thread to process the operation descriptions retrieved at step 135, other threads may have attempted to obtain access to the same target resource and, since the resource is locked, they will have placed operation descriptions on the deferred operation list. The method may, therefore, be implemented such that the thread having control of the target resource makes multiple passes through steps 127-135.

It is conceivable that a situation might arise where attempts to access the target resource by other threads would be so frequent and continuous that operation descriptions are being added to the deferred operation list at a rate such that additional operation descriptions are always on the deferred operation list every time the thread having control of the resource passes through step 123. To protect against any one thread being forced to spend an excessive length of time in repetitively retrieving and processing operation descriptions from the deferred operation list, two software loop counters, each having a separate maximum (MAX1 and MAX2), are included.

After all operations retrieved at step 131 have been processed at step 135, the counter is incremented by one at step 137, indicating that the thread has completed a loop through steps 127-137. At step 141 the status of the counter is compared with a predetermined maximum number of allowable loops to determine if the predetermined maximum number has been equalled. If the maximum has been reached, the thread proceeds to step 125, discussed below. The allowable maximum could be set to any desired number.

If the counter indicates that the maximum number of loops has not been performed, the thread returns to step 123 and checks to see if any additional items have been added to the deferred operation list since step 133 was last performed. If the deferred operation list is empty, the thread proceeds to step 125. If the deferred operation list is not empty, the thread again performs steps 127-141. Therefore, for threads which gained access to the target resource lock at step 105, step 125 will eventually be reached either by (a) the deferred operation list being empty at the initial or a subsequent pass through step 123 or (b) the maximum number of passes being reached at step 141. In a preferred embodiment, MAX1 is set equal to one, limiting the thread to a single loop through steps 127-137.

At step 125, the thread performs the particular operation for which it initially requested access to the target resource at step 103 and resets the loop counter at step 126.

Looking now at FIG. 1A, at step 143, the thread once again checks to see if any items are present on the deferred operation list. If the thread originally obtained the target resource lock at step 105, the deferred operation list may be empty or it may have entries recently placed there by one or more other threads. If the list is in fact empty, the thread moves to step 161 and releases the target resource lock. If the thread obtained the target resource lock at step 119, however, the deferred operation list will contain at least one entry, that being the entry just made by that same thread at step 113, and may also contain additional entries placed there by other threads.

If deferred operation items are present on the deferred operation list at step 143, the thread performs another series of steps to retrieve the new entries on the list. This set of steps, 145-159, is the "release loop". Similarly to steps 127-141 discussed above, the thread will continue to obtain the deferred operation list lock, remove the entries, release the deferred operation list lock, process the entries and increment the counter until either (a) the list is empty at step 143 or the counter reaches it's maximum predetermined value at step 159. In step 126 above, the loop counter had been reset. In a preferred implementation, the maximum number of loops through steps 143-159, MAX2, is set to be 16. Other values could be used.

After release of the resource lock at step, 161 the thread is through with the target resource.

The invention may be implemented in other specific forms without departing from the spirit or essential characteristics thereof. The scope of the invention is indicated by the appended claims rather than by the foregoing description and all changes within the meaning and range of equivalency of the claims are intended to embraced therein.

I claim:

1. In a data processing system capable of supporting a simultaneous operation of a plurality of independent processing threads, a method of operation of a thread trying to gain access to a resource in order to perform a desired operation, the method comprising the steps of:
   (a) attempting to obtain access to the target resource;
   (b) if access to the target resource is not obtained, performing the steps of:
      (1) creating a description of the desired operation, and
      (2) storing the description in memory in a deferred operation list;
   (c) if access to the target resource is obtained, performing the steps of:
      (1) checking the deferred operation list to determine whether any operation descriptions are present; and
      (2) if operation descriptions are present on the deferred operation list, performing the steps of:
         (i) removing the operation descriptions from the deferred operation list, and
         (ii) processing the operations defined by the removed operation descriptions; and
      (3) performing the desired operation on the target resource.

2. The method of claim 1 wherein step (c) comprises the additional steps of:
   (b 4) again checking the deferred operation list to determine whether any operation descriptions are present;

(5) if operation descriptions are present on the deferred operation list, performing the steps of:
  (i) removing the operation descriptions from the deferred operation list, and
  (ii) processing the operations defined by the removed operation descriptions.

3. The method of claim 1 wherein step (c) comprises the additional steps of:
  (4) again checking the deferred operation list to determine whether any operation descriptions are present;
  (5) if operation descriptions are present on the deferred operation list, performing the steps of:
    (i) removing the operation descriptions from the deferred operation list, and
    (ii) processing the operations defined by the removed operation descriptions;
  (6) repeating steps (4) and (5) until the deferred operation list is empty.

4. The method of claim 1 wherein step (c) comprises the additional steps of:
  (4) again checking the deferred operation list to determine whether any operation descriptions are present;
  (b 5) if operation descriptions are present on the deferred operation list, performing the steps of:
    (i) removing the operation descriptions from the deferred operation list, and
    (ii) processing the operations defined by the removed operation descriptions;
  (6) incrementing a loop counter;
  (7) checking the loop counter to determine if the number of loops performed equals a predetermined maximum;
  (8) if the predetermined maximum has not been reached, repeating steps (c)(4)–(c)(7).

5. In a data processing system capable of supporting simultaneous operation of a plurality of independent processing threads, a method of operation of a thread trying to gain access to a resource in order to perform a desired operation, the method comprising the steps of:
  (a) attempting to obtain access to the resource;
  (b) if access is not obtained, performing the steps of:
    (1) creating a description of the desired operation, and
    (2) storing the operation description in memory in a deferred operation list;
  (c) if access is obtained, performing the steps of:
    (1) performing the desired operation on the target resource;
    (2) checking the deferred operation list to determine whether any operation descriptions are present;
    (3) if operation descriptions are present on the deferred operation list, performing the steps of:
      (i) removing the operation descriptions from the deferred operation list, and
      (ii) processing the operations defined by the removed operation descriptions.

6. The method of claim 5, wherein step (b) comprises the additional steps of:
  (3) again attempting to obtain access to the resource;
  (4) if access is obtained, performing the steps of:
    (i) removing the operation descriptions from the deferred operation list, and
    (ii) processing the operations defined by the removed operation descriptions;
  (5) if access is not obtained, continuing with processing as though the desired operation had been performed.

7. The method of claim 1 or 5 wherein step (b) comprises the additional steps of:
  (3) again attempting to obtain access to the resource;
  (4) if access is obtained, performing the steps of:
    (i) removing the operation descriptions from the deferred operation list, and
    (ii) processing the operations defined by the removed operation descriptions;
    (iii) incrementing a loop counter,
    (iv) checking the loop counter to determine if the number of loops performed equals a predetermined maximum;
    (v) if the predetermined maximum has been reached, releasing the target resource;
    (vi) if the predetermined maximum has not been reached, checking the deferred operation list to determine whether any operation descriptions are present;
    (vii) if operation descriptions are present, repeating steps (b)(4)(i)–(b)(4)(vi);
  (5) if access is not obtained, continuing with processing as though the desired operation had been performed.

8. The method of claim 1 or 5 wherein step (b) comprises the additional steps of:
  (3) again attempting to obtain access to the resource:
  (4) if access is obtained, performing the steps of:
    (i) removing the operation descriptions from the deferred operation list, and
    (ii) processing the operations defined by the removed operation descriptions;
    (iii) checking the deferred operation list to determine whether any operation descriptions are present;
    (iv) if operation descriptions are present, repeating steps (b)(4)(i)–(b)(4)(iii) until the deferred operation list is empty;
  (5) if access is not obtained, continuing with processing as though the desired operation had been performed.

9. In a data processing system capable of supporting simultaneous operation of a plurality of independent processing threads, a method of operation of a thread trying to gain access to a resource in order to perform a desired operation, the method comprising the steps of:
  (a) attempting to obtain access to the resource;
  (b) if access is not obtained, performing the steps of:
    (1) creating a description of the desired operation to be performed after access is obtained;
    (2) storing the description in memory in a deferred operation list;
    (3) again attempting to obtain access to the resource;
    (4) if access is obtained, performing the steps of:
      (i) removing the operation descriptions from the deferred operation list, and
      (ii) processing the operations defined by the removed operation descriptions;
    (5) if access is not obtained, continuing with processing as though the desired operation had been performed;
  (c) if access is obtained, performing the desired operation.

10. In a data processing system capable of supporting simultaneous operation of a plurality of independent processing threads, a method of operation of a thread trying to gain access to a resource in order to perform a desired operation, the method comprising the steps of:
(a) attempting to obtain access to the resource;
(b) if access is not obtained, performing the steps of:
  (1) creating a description of the desired operation to be performed after access is obtained;
  (2) storing the description in memory in a deferred operation list;
  (3) again attempting to obtain access to the resource;
  (4) if access is prohibited, performing the steps of:
    (i) removing the operation descriptions from the deferred operation list,
    (ii) processing the operations defined by the removed operation descriptions;
    (iii) incrementing a loop counter,
    (iv) checking the loop counter to determine if the number of loops performed equals a predetermined maximum;
    (v) if the predetermined maximum has been reached, releasing the target resource;
    (vi) if the predetermined maximum has not been reached, checking the deferred operation list to determine whether any operation descriptions are present;
    (vii) if operation descriptions are present, repeating steps (b)(4)(i)–(b)(4)(vi);
  (5) if access is not obtained, continuing with processing as though the desired operation had been performed;

(c) if access is obtained, performing the desired operation.

11. In a data processing system capable of supporting simultaneous operation of a plurality of independent processing threads, a method of operation of a thread trying to gain access to a resource in order to perform a desired operation, the method comprising the steps of:
(a) attempting to obtain access to the resource;
(b) if access is not obtained, performing the steps of:
  (1) creating a description of the desired operation to be performed after access is obtained;
  (2) storing the description in memory in a deferred operation list;
  (3) again attempting to obtain access to the resource;
  (4) if access is obtained, performing the steps of:
    (i) removing the operation descriptions from the deferred operation list, and
    (ii) processing the operations defined by the removed operation descriptions;
    (iii) checking the deferred operation list to determine whether any operation descriptions are present;
    (iv) if operation descriptions are present, repeating steps (b)(4)(i)–(b)(4)(iii) until the deferred operation list is empty;
  (5) if access is not obtained, continuing with processing as though the desired operation had been performed;
(c) if access is obtained, performing the desired operation.

* * * * *